US005839592A

United States Patent [19]

Hayes

[11] Patent Number: 5,839,592
[45] Date of Patent: *Nov. 24, 1998

[54] PLASTIC CLOSURE

[75] Inventor: Thomas H. Hayes, Loveland, Ohio

[73] Assignee: Anchor Hocking Packaging Co., Lancaster, Ohio

[*] Notice: This patent issued on a continued prosecution application filed under 37 CFR 1.53(d), and is subject to the twenty year patent term provisions of 35 U.S.C. 154(a)(2).

[21] Appl. No.: 488,874

[22] Filed: Jun. 9, 1995

[51] Int. Cl.$^6$ ............................................. B65D 53/04
[52] U.S. Cl. ............................ 215/230; 215/276; 215/347; 215/349
[58] Field of Search ................................ 116/206; 426/87, 426/88, 231; 436/2; 215/230, 232, 274, 276, 277, 347, 341, 349, DIG. 2; 220/359, 214, 288, 304, 319, 327, 366.1, 377

[56] References Cited

U.S. PATENT DOCUMENTS

| | | |
|---|---|---|
| 1,740,881 | 8/1929 | Taliaferro . |
| 1,985,437 | 12/1934 | Bell . |
| 3,067,015 | 12/1962 | Lawdermilt ........................ 116/206 X |
| 3,198,163 | 8/1965 | Williams ............................... 116/206 |
| 3,414,151 | 12/1968 | Morrison ................................ 215/40 |
| 3,433,380 | 3/1969 | Kawchitch . |
| 3,480,402 | 11/1969 | Jackson .............................. 116/206 X |
| 3,595,419 | 7/1971 | Dukesa . |
| 3,924,772 | 12/1975 | Magnani . |
| 4,057,159 | 11/1977 | Fillmore et al. .................... 215/347 X |
| 4,093,094 | 6/1978 | Smalley et al. . |
| 4,122,964 | 10/1978 | Morris . |
| 4,396,655 | 8/1983 | Graham ........................ 215/DIG. 2 X |
| 4,418,834 | 12/1983 | Helms et al. ...................... 215/232 X |
| 4,436,213 | 3/1984 | Paul et al. . |
| 4,462,502 | 7/1984 | Leunser et al. ......................... 215/329 |
| 4,505,399 | 3/1985 | Weiner ................................... 215/230 |
| 4,616,761 | 10/1986 | Nolan .................................... 215/271 |
| 4,640,428 | 2/1987 | Chang . |
| 4,673,096 | 6/1987 | Towns et al. ......................... 215/230 |
| 4,678,082 | 7/1987 | Fillmore ............................... 206/459 |
| 4,722,451 | 2/1988 | Conrad ................................. 215/365 |
| 4,737,463 | 4/1988 | Bhattacharjee et al. .......... 116/206 X |
| 4,747,497 | 5/1988 | Holman ............................... 215/230 |
| 4,782,968 | 11/1988 | Hayes . |
| 4,812,317 | 3/1989 | Taylor . |
| 4,877,143 | 10/1989 | Travisano ............................ 215/230 |
| 4,887,730 | 12/1989 | Touzani ............................... 215/271 |
| 5,033,633 | 7/1991 | Heilman .............................. 215/271 |
| 5,152,412 | 10/1992 | Iler ...................................... 215/230 |
| 5,197,618 | 3/1993 | Goth ................................ 215/347 X |
| 5,240,131 | 8/1993 | Keller . |
| 5,372,268 | 12/1994 | Han ................................. 220/359 X |
| 5,458,896 | 10/1995 | Porter ................................ 426/87 X |

FOREIGN PATENT DOCUMENTS

272431 B1  7/1993  European Pat. Off. .

OTHER PUBLICATIONS

"Encyclopedia of Chemical Technology", A Wiley–Interscience Publication, p. 16, 1994.

"Concise Encyclopedia of Polymer Processing & Applications", Pergamon Press, pp. 102–103, 1992.

Primary Examiner—Stephen K. Cronin
Assistant Examiner—Nathan Newhouse
Attorney, Agent, or Firm—Wood, Herron & Evans, LLP

[57] ABSTRACT

A closure is formed from a laminate or composite. The laminate is sufficiently flexible to permit it to assume the surface configuration of the rim of a closure without the need for a gasket. The laminate may include an upper layer which is rigid and a lower layer which is softer and has a lower softening temperature than the upper layer. An optional intermediate oxygen-impermeable layer such as ethylene vinyl alcohol can be included between the upper and lower layers. Preferably, the upper layer is a rigid material such as polyethylene terephthalate or polyvinyl chloride and the lower layer is a soft material such as linear low-density polyethylene. The upper layer provides the necessary strength, while the lower layer provides a tight seal on the rim of the container. The intermediate or bottom layer can also include an oxygen indicator which changes color upon exposure to oxygen.

20 Claims, 3 Drawing Sheets

PLASTIC CLOSURE

BACKGROUND OF THE INVENTION

Composite closures are multi-piece closures used to seal various containers, particularly glass jars. These often include a metal disk-shaped cover which is held onto the top of a container or jar by a metal threaded band. To access the contents of the container the band is simply rotated and removed from the container and the disk subsequently removed.

Although non-metallic disks have been used in such composite closures, by far the majority of these composite closures employ a metal disk. Metal disks have several inherent problems. In addition to being relatively expensive, metal disks also tend to corrode. Therefore, in order to avoid corrosion, metal disks must be treated with a protective coating on the top and bottom surfaces and often on the peripheral edge. Metal disks also require a sealing gasket in order to form a proper seal.

Because of the rigidity of the metal disks, it is very difficult to remove them. Frequently a bottle-opener is required to separate the disk from the container.

Some composite closures employ non-metal disks such as that disclosed in PCT Application W 9117093. Other non-metallic disks are disclosed in Morris U.S. Pat. No. 4,122,964 and Hayes U.S. Pat. No. 4,782,968. Each of these discloses a non-metallic disk which is simply a planar disk having no surface configuration or groove comparable to the groove formed in a metal disk. As such, it is relatively difficult to obtain a good seal. Additionally, many of these closures cannot withstand packaging temperatures which can be in excess of 100° C.

Most of these disks, metal and nonmetal, employ a gasket material to form a seal. The gasket material can be a bead of material, such as that typically used in a channel of a metal disk or can be of a layer of material such as is disclosed in the Morris reference.

Gasket material is very soft and allows the rim to embed itself in the gasket material. This may be up to 0.040" thick. It must be this thick to seal the imperfect surface of the rim of the container when the disk, itself, is relatively stiff.

Unfortunately the gasket materials are generally poor oxygen barriers. This permits oxygen to the permeate into the container between the disk and the rim.

Food products packaged in such containers, particularly those which need a shelf life in excess of one year, require that all oxygen be removed from the headspace. This is frequently accomplished by packaging the products in a steam atmosphere. This drives off all the ambient air, replacing it with a vacuum. However, if a leak should occur, or if oxygen enters through the gasket, it will contaminate the product. Over a period of time, the product can develop an off taste and thus be unsuitable for consumption. Also, if the product is tampered with, oxygen will enter and should be detectable. Thus, in certain applications it would be preferable to provide an oxygen sensitive material or indicator to detect the presence of oxygen in the headspace.

SUMMARY OF THE INVENTION

The present invention is premised upon the realization that a complete closure can be formed wherein the disk of the closure is formed from a plastic which is sufficiently flexible to conform to the rim of a container and provide a seal.

More particularly, the present invention is premised upon the realization that such a plastic closure can be formed from a thermoplastic composite having an upper or outer layer which is a strong but flexible plastic material, and a lower layer which is softer and comparably easily deformed particularly at elevated application temperatures. In a composite closure, the disk would be formed from this composite laminate. Such a closure is effective without a sealing gasket typically employed in metal closures.

Such a composite laminate can be formed with various intermediate layers such as an oxygen-barrier layer which would prevent oxygen permeation into the headspace. Further, the intermediate or bottom layer can be provided with an oxygen-sensitive material which provides some indication when exposed to oxygen. In one preferred embodiment, the oxygen-sensitive material or indicator is one which can be activated with ultraviolet light, other radiation and/or heat. The upper layer is clear so that after packaging the container can be exposed to ultraviolet radiation, activating the oxygen indicator. This keeps the oxygen indicator from changing colors prior to packaging and allows activation only after it has been laminated, formed into a disk, and attached to a closure over a container.

The composite can be used in a variety of different closures including one piece closures and can be modified for use for various applications, such as carbonated soft drinks.

The objects and advantages of the present invention will be further appreciated in light of the following details and drawings in which:

DETAILED DESCRIPTION

Figure 1:
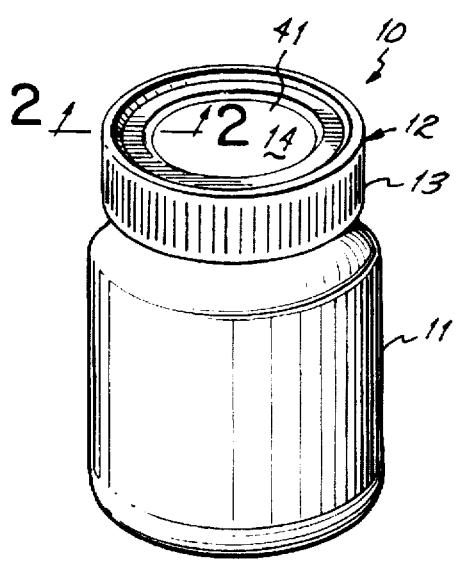
FIG. 1 is a perspective view of a container incorporating a closure of the present invention.

The present invention is a closure 12 for a container 11 such as a glass jar. The closure shown in FIG. 1 is a two-part closure. It incorporates a ring 13 and a disk 14. The disk 14 rests on a rim 16 of container 11 and includes an annular channel 18 which nests on rim 16, and a central body portion 17, as shown in FIGS. 1 and 2.

Figure 2:
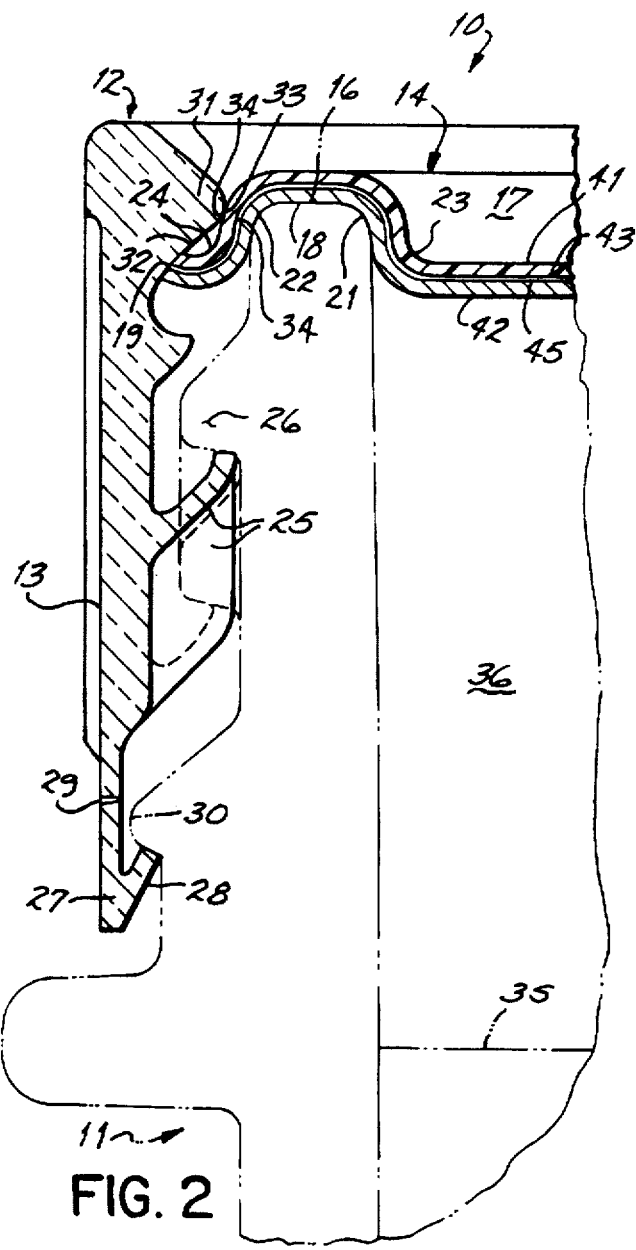
FIG. 2 is a cross-sectional view, broken away, taken at lines 2—2 of FIG. 1.

As can be seen in FIG. 2, the annular channel 18 includes an inner radiused surface 21 and an outer radiused surface 22 which, as shown, mate with the surfaces of rim 16. There is also a radius 23 between the channel 18 and body 17, as well as an exterior radius 24 between the outer edge 19 and annular channel 18.

The ring 13 as shown is a screw-on ring. However, other rings, such as force on/snap off rings, can be used as well. The ring 13 includes inner projections or threads 25 which are adapted to engage the threads 26 of container 11. The ring 13 also has a lower skirt 27 with a flange or lip 28 adapted to engage a lower annular ridge 30 on container 11. A score line 29 is provided to permit this lower skirt 27 to be separated from ring 13 upon rotation of ring 13, providing tamper indication.

At the top of ring 13 is an inward annular ridge 31. Annular ridge 31 includes a lower sloped surface 32 and an innermost edge 33. This lower sloped surface 32 engages the outer edge 19 of disk 14 which forces the outer radius 22 of disk 14 against the rim 16 of the container. Inner edge 33 also presses against the portion 34 of disk 14 opposite this outer radius 22.

Thus the ridge 31 forces the channel 18 against rim 16, forming a portion of a seal between the two. Downward force on body 17 (as will be caused by a vacuum in container 11) forces the inner radius 21 of channel 18 against the rim 16 completing the seal.

Disk 14 must be strong enough to withstand the internal and external forces encountered and be sufficiently flexible to conform to the non-planar and surface irregularities of the rim of the container. In certain embodiments described hereinafter, the disk can be formed to provide certain other characteristics for certain applications, such as hot filling, etc.

The flexibility of the disk is key to the proper functioning of the closure. Whereas stiff metal disks rely on a thick gasket, the disk 14 is sufficiently flexible to conform to the contour of, and seal, the container without the need for an additional annular gasket or thick compression layer.

The disk must be formed from a material which is sufficiently flexible to allow the disk to conform to the surface of the container. Flexibility can be defined in terms of the reciprocal of the product of the modulus and the cubed thickness of the material. For example, steel having a thickness of 0.17 mm (0.007 inches) and an elastic modulus of 205 GPa has a resultant flexibility of 0.993 $GPa^{-1}$ $mm^3$. The modulus and flexibility (referred to as K) of a variety of materials is shown in Table 1. The modulus is given for a nominal temperature of 90° C. The modulus for these materials can vary depending upon the particular formulation of the polymer and thus a range is provided for polypropylene (PP), polyvinylchloride (PVC), and polyethylene terephthalate (PET).

The flexibility should be no less than 5 $GPa^{-1}$ $mm^3$ and preferably no less than 10 $GPa^{-1}$ $mm^{-3}$ and no greater than about 100 $GPa^{-1}$ $mm^{-3}$. As the material becomes thinner, it of course becomes weaker and is subject to rupturing. Accordingly, the material should not be any thinner than 0.25 mm (0.01 inches). Preferably, the flexibility will be from 15 to 90 $GPa^{-1}$ $mm^{-3}$, and the thickness of the material will be at least about 0.3 mm (0.012 inches).

TABLE 1

| Material | Elastic Modulus GPa | K $GPa^{-1}$ $mm^{-3}$ |
| --- | --- | --- |
| Steel (.17 mm) | 205 | 0.993 |
| PP .4 mm | 0.2 | 78.1 |
| PP .4 mm | 0.5 | 31.3 |
| PVC .4 mm | 0.2 | 78.1 |
| PVC .4 mm | 0.3 | 52.1 |
| PET .4 mm | 0.4 | 39.2 |
| PET .4 mm | 0.8 | 19.5 |

The disk as shown is a multi-layered disk which is referred to as a laminate. Laminate is intended to include materials which are coextruded or coinjected and co-compression molded as well as those which are thermally laminated and the like.

Disk 14 includes an upper layer 41, a lower layer 42 and an optional middle layer 43. The middle layer 43 or the lower layer 42 can be provided with an optional oxygen-sensitive indicator 45 which, as shown, may provide indicia when exposed to oxygen.

The upper layer 41 can be a variety of thermoplastic materials. These will generally be materials which are stiffer than the lower layer 42 and can also be thicker. Further, the upper layer 41 will have a softening and melting temperature higher than the softening and melting temperatures of the lower layer 42. These materials suitable for use as the upper layer will have the following minimum characteristics:

flex modulus: 800 Mpa–3000 Mpa ($N/mm^2$))
thickness: 0.01–0.04" (0.25–1mm)

Suitable materials for the upper layer include polyesters such as polyethylene terephthalate, acrylates, polyamides, polypropylenes, high-density polyethylene, and polyvinyl chloride.

The lower layer 43 will be a softer material and preferably one which may soften, if appropriate, at or below elevated sealing temperatures (generally 85–90° C. and above) but which has a melting point above sealing temperatures. This material should have the following characteristics:

flex modulus: 20–100 Mpa ($N/mm^2$)
thickness: 0.001–0.012" (0.025–0.3 mm)

Particularly suitable materials include linear low-density polyethylene, thermoplastic elastomers and soft polypropylene.

The middle layer 43 is optional and is generally a material which has a very low oxygen permeation rate, i.e., acts as an oxygen barrier. Such barrier layers are known. Typical barrier layers include ethylene vinyl alcohol, and polyvinylidene chloride. Metal foil can also be used or a deposited metal film, but this is less preferred. These are selected because they have an oxygen permeation rate less than 0.02CC $O_2$ per square inch per 24 hours. The oxygen barrier layer can also be on the exterior of the closure instead of the middle. These layers can all be transparent if desired.

Figure 3:
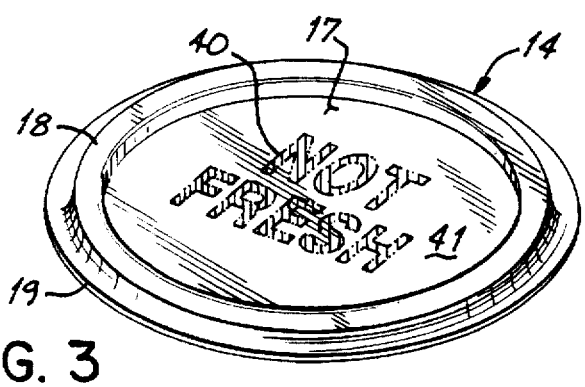
FIG. 3 is a perspective view of a disk for use in the present invention.

It may be desirable in many applications to include an oxygen indicator (shown as 40 on FIG. 3). Such oxygen indicators are chemicals which, upon exposure to oxygen, change colors. A preferred oxygen indicator is one which can be activated after packaging, for example, by application of ultraviolet light. In other words, the chemical composition will not react with oxygen until it has been exposed to relatively intense ultraviolet radiation. Thus after the closure is applied to the container, the closure is exposed to ultraviolet radiation (or a pressure or heat source) which activates the oxygen indicator. Ultra violet light activation will only function if the upper and middle layers are transparent to ultraviolet light. Accordingly, the upper and middle layers will be formed from clear plastic. However, if this oxygen-sensitive material is not incorporated into the disk, these layers can be pigmented.

The oxygen sensor is applied between the middle layer and the lower layer, as indicated by number 45 or on the bottom layer. It can be printed on to provide indicia 40, or can simply be a uniform coating. Suitable oxygen sensitive materials include ferrous sulfate or ferrous hydroxide, or methylene blue, microencapsulated in a UV sensitive polymer.

The laminate can be formed in a variety of different manners. It can be coextruded, formed with adhesives or, preferably, individual sheets of the material can be thermally laminated.

After the laminate has been formed, the individual disks 14 can be thermally formed using a heated die which cuts out the disk and at the same time forms the annular channel 18. The disks can also be formed by co-compression molding or by injection molding, for example, using the method disclosed in U.S. Pat. No. 4,803,031.

The container 11 can be filled and the closure applied in several manners. According to one method, the container 11 is filled with material 35 leaving a headspace 36. Steam is injected in and around this headspace while the ring 13 holding disk 14 is forced down over the container opening allowing the threads 25 of ring 13 to pass over threads 26 in container 13. Once ring 13 is in place, the threads 25 will engage threads 26 of the container 13, sealing and holding the disk 14 in place.

More specifically, the lower surface 32 of annular ridge 31 will press upon the outer edge 19, forcing the outer radiused surface 22 against the rim 16 of the container. Likewise, the inner edge 33 of this annular ridge 31 will press upon portion 34 of disk 14, likewise forcing it against the rim of the container. Since the headspace is filled with steam, this will eventually cool and condense, reducing the internal pressure, pulling the body portion 17 of disk 14 downwardly flexed toward headspace 36, which will force the inner radiused surface 21 of disk 14 against the rim of the container.

The disk 14 may be softened by the heat from the steam, if appropriate, allowing it to conform to the surface of the container. This eliminates the need for any gasket material which would normally be located in an annular channel such as this. Also, the ability of disk 14 to deform at elevated application temperature allows this disk to compensate for any imperfections that might exist in the rim of the container 11, again eliminating the need for any gasket material. Moreover, lower layer 42 being inherently relatively thin, oxygen permeation will be less than through thicker, traditional gasket materials.

In applications where steam is not employed, the disks 14 can be preheated to a temperature effective to soften but not melt the disk 14 and lower layer 42. The disks 14 and rings 13 would then be applied at this temperature, again allowing the disk 14 and the lower layer 42 to conform to the surface of the rim. The closure i.e., disk 14 and ring 13 can also be applied at room temperature, with ring 13 applying sufficient pressure to cause disk 14 to conform to the surface of a rim of a container.

If the disk 14 includes an oxygen sensitive indicator, the container, once filled and sealed, will be passed under an ultraviolet light, or other activator. The light is chosen to radiate an effective wavelength and intensity to activate the indicator. Thus, the container is filled, sealed and the oxygen indicator activated.

To access the contents of the container, the ring is simply rotated (if threaded or pried off if snapped on). The engagement of the threads 25 with the threads 26 of the container will cause the ring to separate. The lower skirt 27 will separate from the ring at score line 29, leaving this skirt on the neck of the container. The threads may engage the disk, pulling it off. The ability of the plastic disk to flex makes this a very easy operation as opposed to a inherently more rigid metal disk.

Further, if oxygen-sensitive indicator 40 is employed, should any oxygen have been in the headspace after the oxygen-sensitive indicator was activated, it will provide an indication of such. As shown in FIG. 3, this indication of oxygen exposure can be in the form of certain specific indicia 40 which will appear only if sufficient oxygen was present in the headspace to cause the indicator to change color.

Figure 4:
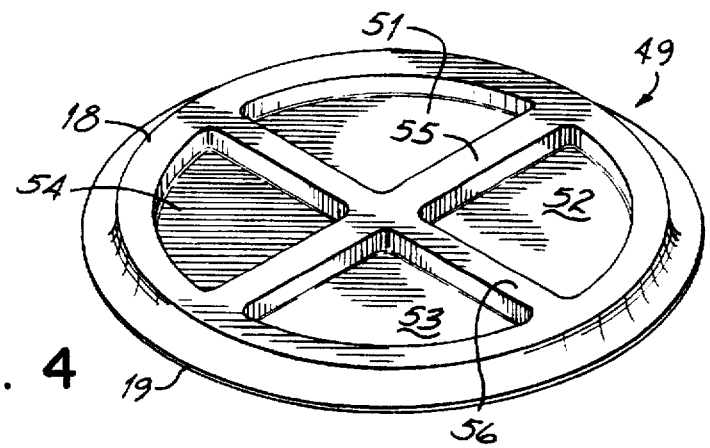
FIG. 4 is a perspective view of an alternate embodiment of a disk for use in the present invention.

FIG. 4 shows an alternate embodiment of the present invention. This is simply a modified disk 49 which is most suitable for large container sealed under vacuum, or small containers which have relatively higher internal pressure such as carbonated products. Such disks 49 need added strength in the body of the disk. Accordingly, the body portion 50 has been debossed along triangular sections 51, 52, 53 and 54, which leaves two cross-beams 55 and 56 crisscrossing the body portion 50 of disk 49. These beams simply provide added structural support for the central body portion of disk 49 but permit the perimeter of the disk to conform to the container rim.

A variety of different debossments or embossments can be employed in order to provide structural strength and the size and shape of beams or reinforcement members can be easily modified to provide the necessary degree of strength. Preferably in a 3-layer, oxygen barrier laminate, these debossments are thermally formed as the disk is formed by using a heated die punch.

Thus, incorporating the laminated plastic disk which has an upper layer which is strong and a lower layer which is softer but wherein the disk per se is flexible, an improved closure is provided which is inexpensive to manufacture and apply, and yet, at the same time, provides extremely efficient long-term sealing capabilities. With the addition of an optional oxygen-sensitive material, the closure can provide an indication of contamination or product degradation.

Figure 5:
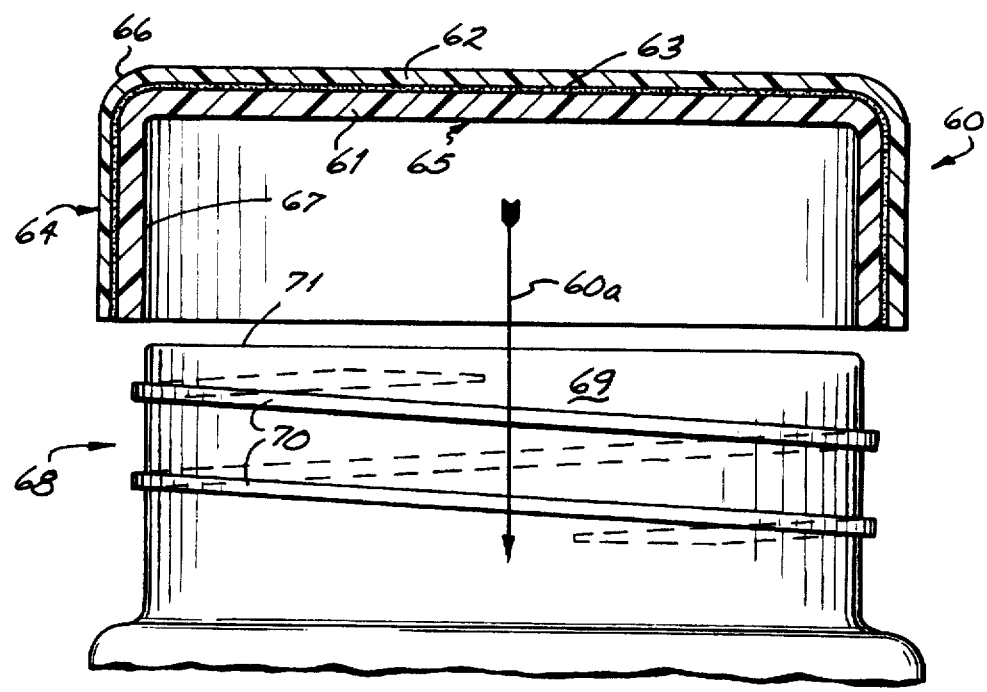
FIG. 5 is a diagrammatic cross-sectional view of an alternate embodiment of the present invention.
Figure 6:
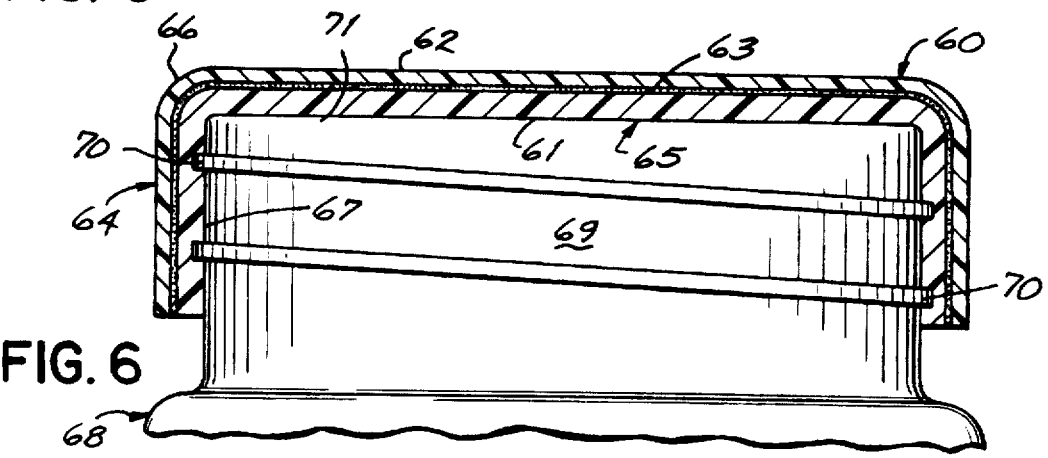
FIG. 6 is a cross-sectional view of the embodiment shown in FIG. 5 attached to a jar.

As shown in FIGS. 5 and 6, the present invention can be utilized to form a one-piece closure for a jar or similar container. As shown in FIG. 5, a single piece cap 60 is formed from the same composite material as disk 14. Again, this is simply stamped from a sheet of material, thermoformed or double-shot injection molded. Cap 60 includes the inner layer 61 which is formed from the soft lower-melting-point thermoplastic material and includes an outer layer 62 of a stronger, high-melting-point thermoplastic material. There is also an intermediate layer 63 which is optional and provides oxygen-barrier properties. Again, these are the same as layers 41, 42 and 43 from FIG. 2.

The one-piece closure 60 includes an annular ring 64, along with a central body portion 65 which join together at the circular edge 66. As shown in FIG. 5, the inside surface 67 of ring 64 is a smooth surface without any formed threads. As shown by arrow 60a, the cap 60 is adapted to fit over and close a jar 68 which includes an upper portion 69 with threads 70 and an upper lip 71.

The lid 60 is used to seal jar 68 by first forming the closure 60. As shown in FIG. 5, while maintaining the temperature of the inner portion 67 above the softening point of layer 62, lid 60 is forced down upon the upper portion of jar 68. The dimensions of the inner surface 67 of closure 60 are such that when the closure is forced down over the upper portion of jar 68, the threads 70 will contact the smooth surface 67 of ring 64 and indent this portion to make it conform to the threads of the jar 68. When the closure cools down, the inner surface will be deformed providing grooves which correspond to the threads 70 of jar 68, as shown in FIG. 6. The lid can then be removed by simply rotating the lid 60. As with the embodiment shown in FIG. 1, this lid can be of a clear or opaque material. Further, there can be an indicating material which is oxygen sensitive located between layers 62 and 63.

In an alternate embodiment not shown, the inner surface of the ring portion 64 can have preformed threads which would correspond to the threads of the container to which it mates. In all of these embodiments, the closure is formed from a flexible material which can conform to the surface of the rim at application temperature without the need for a thick gasket layer.

In a fourth embodiment of the present invention, the outer material 62 can be formed from a heat shrinkable material. In other words, it would be formed from the same rigid material previously discussed, but formed in an expanded condition. These could be thermoformed in a manner which would maintain the stretched dimensions of the exterior material, i.e., by forming it over a mold. Alternately, the closure could be reheated and applied simultaneously onto a jar that is the same size of this closure before reheating. Once on the jar, heat—separately applied—would cause the heat shrinkable material to shrink to a non-expanded state, providing inward pressure against the sides of the jar and providing a tight seal. In this embodiment it would be preferred that the closure not have preformed threads as shown in the embodiment illustrated in FIG. 5.

In these single or one-piece closure embodiments shown in FIGS. 5 and 6, the inner material of the laminate both provides the threading on the side to engage the threads on the jar, and provides a seal material for the upper edge 71 of the jar. Thus, when applied, the upper edge will engage the lower surface of the closure. Due to the fact that the closures are generally softened at application temperature, a tight seal forms regardless of the minor imperfections along the surface of the jar.

Figure 7:
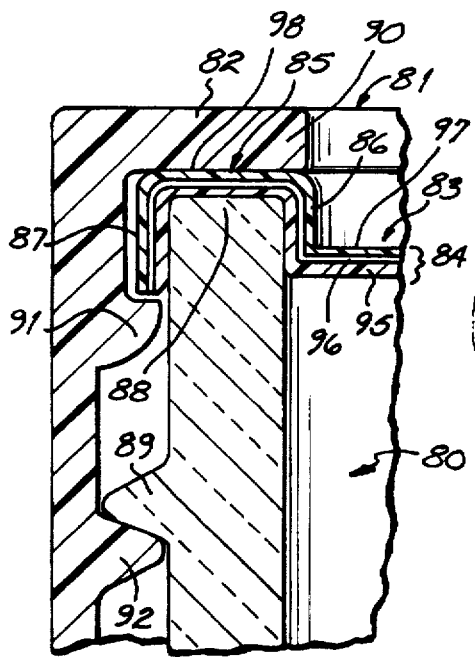
FIG. 7 is a cross-sectional view of an alternate embodiment.

A bottom loading closure/disk is shown in FIG. 7. In this embodiment, the closure 81 includes a ring 82 and a central disk 83 having a central body portion 84 and an annular flange portion 85. The flange portion 85 includes two side walls 86 and 87, which when positioned over a jar, surround the rim portion 88 of the jar 80. The rim portion 88 may include external threading 89 as shown or be a press on/snapped off closure.

The disk 83 is held in position on the ring 82 between an upper radially inward ledge 90 of ring 82 and a lower radially inward lip or ridge 91. In this embodiment, the disk 83 is simply snapped into the area between the flange 90 and lip 91 and is held in position or allowed to "float" in position. The ring 82, in turn, is held on to the jar 80 by threads 92, which engages the threads 89, etc. of the jar.

Like the embodiment shown in FIGS. 1 and 2, the disk 83 is a flexible disk preferably a composite or laminated disk which includes an inner soft material 95, the same as the soft material disclosed with reference to the embodiment shown by FIG. 1. It has an outer stiffer material 97 and may have an oxygen barrier 96. Although not shown, this can also include the oxygen-sensitive material laminated between the soft material 95 and the oxygen barrier 96. In this embodiment, because the channel has the two side portions 86 and 87 on either side of the rim 88, the ring does not need to engage the outer peripheral edge, but rather the ring 82 engages the top portion 98 of the channel 85, forcing it down on rim 88, forming a seal. Again, disk 83 is sufficiently flexible to enable it to conform to the irregular shape of the rim.

Figure 8:
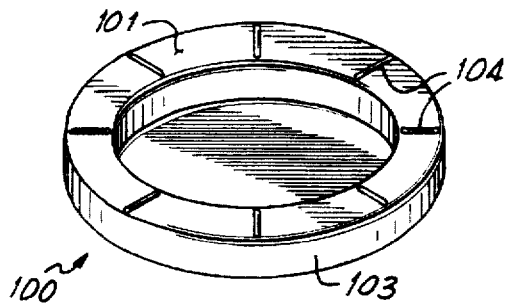
FIG. 8 is a perspective view of a bottom loaded disk particularly useful with carbonated liquids.

A modified bottom loading disk 100 is shown in FIG. 8. In this embodiment the top portion 101 of channel 103 includes radially extended ridges 104 which will allow internal gas flow up from the area between the ring and neck of the container (not shown). This is important if the closure is used for a pressurized container to vent first and prevent cap blow-offs. These ridges can be replaced by radial grooves or with grooves or ridges on the ring. Also, the edge 19 of the disk 17 shown in FIG. 1 can have grooves to vent internal gas up.

Figure 9:
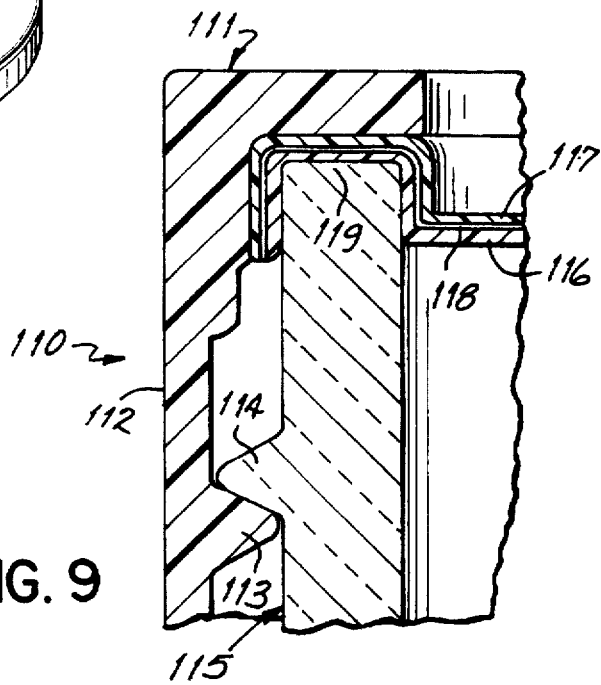
FIG. 9 is a cross-sectional view of an alternate embodiment.

In a further embodiment shown in FIG. 9, a disk 110 formed from the same flexible laminate or composite as the disk 14 is an insert in a closure 111. Closure 111 includes disk 110 and ring 112 which is injection molded around ring 112. Ring 112 can be any thermoplastic typically used for plastic closure such as polyvinylchloride, polypropylene or polyethylene as well as others.

Ring 112 as shown includes internal threads 113 to engage external threads 114 of container 115. However, ring 112 could also be a snap on, pry off closure.

Again, disk 110 includes a lower thin soft layer 116 and an upper thicker more stiff layer 117 with an optional oxygen barrier layer 118 fixed between them. Disk 110 is sufficiently flexible to conform to and seal rim 119 of container 115.

In another alternate embodiment of the present invention, the lower soft flexible material referred to as 42 in FIG. 2 is modified to be an annular strip of material within the disk as opposed to a lamina coextensive with the upper lamina 41.

Figure 11:
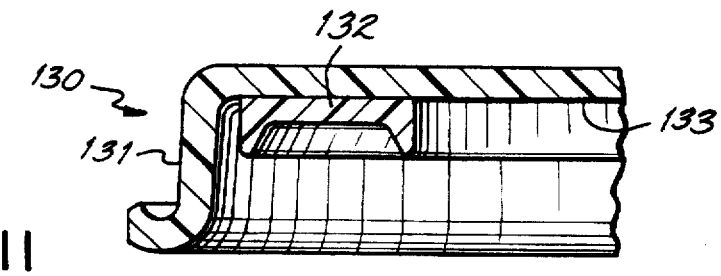
FIG. 11 is a diagrammatic cross-sectional view of an alternate embodiment of the present invention.

As shown more particularly in FIG. 11, the disk 130 includes a disk portion 131 which has the same thickness and is formed from the same material as upper rigid layer 41 in FIG. 2. Particularly preferred are those that provide an oxygen barrier. An inner portion of disk 131 includes an annular sealing strip 132 of a soft or more flexible material. This is positioned to engage or mate with the rim of a jar or other container. Annular sealing strip 132 surrounds but does not cover the central portion 133 of disk portion 131. Annular sealing strip 132 is formed from the same material as layer 41 and preferably has a thickness of 0.001 to 0.012".

Figure 10:
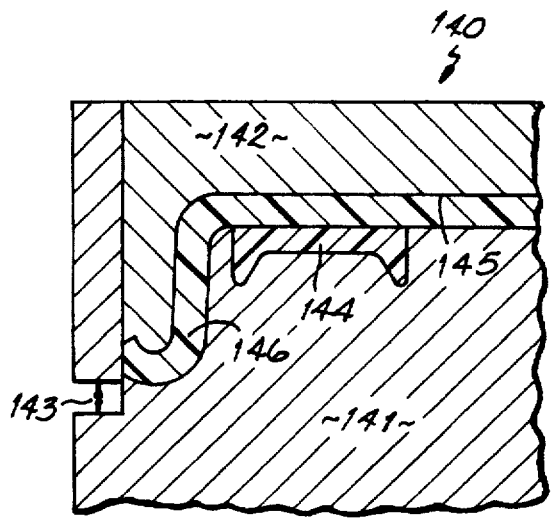
FIG. 10 is a cross-sectional view of a mold used to form the disk shown in FIG. 11.

Preferably this disk 130 is formed by a coinjection molding procedure such as described in U.S. Pat. No. 4,803,031 the disclosure of which is incorporated herein by reference. A cross section of a mold suitable for preparing disk 130 is shown in FIG. 10. This is a two-piece mold 140 which includes a lower mold section 141 and an upper mold section 142. The upper and lower mold sections are moveable relative to each other by a distance indicated by double arrow 143. The lower mold section 141 includes an annular cavity 144 which is used to form sealing strip 132. With the two-piece mold 140 in the closed position (not shown), the lower surface 145 of upper mold section 142 forms the upper surface of annular cavity 144. This annular cavity 144 is then injected with a soft material which would be the same as the materials which form layer 42 of disk 14.

After the material in cavity 144 solidifies, the lower mold section 141 is retracted the distance indicated by double arrow 143 to create a second mold cavity 146 which defines the disk portion 131 of disk 130. This cavity is then injected with a second thermoplastic material which is the same as the material which makes up lamina 41 of disk 14 preferably an oxygen barrier. This is a more rigid, stronger material than the material used to form annular strip 132, i.e., that injected into cavity 144. The liquid thermoplastic in cavity 144 bonds to the material in cavity 148 forming composite disk 130.

The disk shown in FIGS. 10 and 11 is a top loading disk. This of course can be modified to form a bottom loading disk. Alternately, the same method can be used to form a one piece composite closure such as shown in FIGS. 5 and 6 wherein the lower layer of material 61 is again replaced with an annular strip such as 132 in FIG. 11.

The two or three layer laminated closure of the present invention, either as part of a composite closure or a one-piece closure, provides reliable seals without a separate gasket. Further, the layers can be modified to provide more or less strength, oxygen barrier properties, seal integrity, and tamper indication, thus providing unique versatility and efficiency.

Further, the present invention lends itself in particular to use of an oxygen-sensing material which can be selectively activated by ultra-violet light after filling. These advantages are all part of the present invention.

This has been a description of that invention, along with the preferred method of practicing that invention currently known. However, the invention itself should only be defined by the appended claims wherein we claim:

I claim:

1. A disk for a composite closure, said disk adapted to fit over and seal a container opening, said opening having a rim;

said closure comprising a polymeric disk having a flexibility effective to allow it to conform to the surface configuration of said rim to provide a tight seal without application of a separate sealing gasket;

said disk comprising an upper layer laminated to a lower layer wherein said lower layer softer than said upper layer; and said disk having a flexibility of at least 5 GPa$^{-1}$ mm$^{-3}$ at 85°–90° C. and wherein said lower layer has a softening temperature lower than the softening temperature of said upper layer;

said disk further incorporating an intermediate oxygen barrier layer and an oxygen-sensitive indicating substance between said oxygen barrier layer and said lower layer.

2. The disk for a composite closure claimed in claim 1 having a peripheral annular channel, an edge and a central body;

said disk comprising a thermally-deformable upper layer having a first softening temperature and a lower layer comprising a thermally-deformable material said lower layer being softer than said upper layer.

3. The disk claimed in claim 2 wherein said edge extends radially outward from said channel.

4. The disk claimed in claim 2 wherein said central body includes at least one beam effective to provide structural strength to said body.

5. The disk claimed in claim 2 wherein said disk is a bottom loading disk and includes a plurality of ridges on a top portion of said channel.

6. A composite closure comprising a ring and the disk claimed in claim 2 wherein said disk is held within said ring.

7. The composite closure claimed in claim 6 wherein said ring includes internal threading adapted to engage external threads on a neck of a container and further includes an internal ridge adapted to press said channel against a rim of said container.

8. A composite closure comprising a ring and the disk claimed in claim 2 wherein said disk is held within said ring.

9. A composite closure comprising the ring and the disk claimed in claim 2 wherein said ring includes a ridge adapted to press down on said edge further forcing said channel against a rim of a container.

10. The disk claimed in claim 1 wherein said lower layer is from 0.002 to 0.012" thick.

11. The disk claimed in claim 10 wherein said upper layer is from 0.010 to 0.040" thick.

12. A composite closure comprising a ring and the disk claimed in claim 10 wherein said disk is held within said ring.

13. The disk claimed in claim 1 wherein said oxygen barrier layer is selected from the group consisting of ethylene vinyl alcohol, polyvinylidene chloride and metal foil.

14. A composite closure comprising a ring and the disk claimed in claim 13.

15. The disk claimed in claim 1 wherein said upper layer is selected from the group consisting of polyethylene terephthalate, polyvinyl chloride and high-density polyethylene.

16. The disk claimed in claim 1 wherein said lower layer is selected from the group consisting of thermoplastic elastomer, linear low-density polyethylene and polypropylene.

17. The disk claimed in claim 1 wherein said oxygen-sensitive indicating substance is a UV-activatable oxygen-sensitive material and wherein said upper layer and said middle layer are transparent to ultraviolet light.

18. The disk claimed in claim 1 wherein said disk is a bottom loading disk and includes a plurality of grooves in a top portion of said channel.

19. The composite closure claimed in claim 18 wherein said ring includes a gas vent means on a bottom portion of said ring.

20. A composite closure comprising a ring and the disk claimed in claim 1 wherein said ring is a press-on/snap-off ring wherein said disk is held within said ring.

* * * * *